(12) United States Patent
Dietrich et al.

(10) Patent No.: US 6,269,937 B1
(45) Date of Patent: Aug. 7, 2001

(54) CONVEYOR DEVICE

(75) Inventors: Walter Dietrich; Eberhard Krieger, both of Weinstadt; Klaus Stoeckel, Korb, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/446,381

(22) PCT Filed: May 27, 1998

(86) PCT No.: PCT/DE98/01450

§ 371 Date: Dec. 21, 1999

§ 102(e) Date: Dec. 21, 1999

(87) PCT Pub. No.: WO99/03762

PCT Pub. Date: Jan. 28, 1999

(30) Foreign Application Priority Data

Jul. 19, 1997 (DE) ............................................. 197 31 084

(51) Int. Cl.$^7$ ....................................................... B65G 15/44
(52) U.S. Cl. ................. 198/484.1; 198/803.13; 198/834; 198/845; 198/838
(58) Field of Search ............................ 198/484.1, 803.13, 198/803.1, 834, 845, 838

(56) References Cited

U.S. PATENT DOCUMENTS

| 2,358,292 | * | 12/1944 | Malhiot . |
| 3,365,051 | * | 1/1968 | Mullis et al. . |
| 4,893,707 | * | 1/1990 | Langen et al. .................. 198/803.13 |
| 5,188,219 | * | 2/1993 | Mitsumoto ........................... 198/834 |

* cited by examiner

Primary Examiner—Robert P. Olszewski
Assistant Examiner—Richard Ridley
(74) Attorney, Agent, or Firm—Ronald E. Greigg; Edwin E. Greigg

(57) ABSTRACT

A conveyor device for erected collapsible box. The conveyor device has a number of conveyor chains with drive ribs for the collapsible boxes. The conveyor chains are made up of chain links that are connected to one another in an articulating relationship. The chain links have guide pins that are guided in an upper and lower guide rail. The conveyor device is made to embody the deflecting regions of the conveyor chains so that the conveyor chains are free of guide elements. This is achieved by a particular disposition of the guide pins and the guide rails. The conveyor device has a particularly simple design and is also suited for small collapsible box formats.

13 Claims, 3 Drawing Sheets

CONVEYOR DEVICE

PRIOR ART

The invention relates to a conveyor device as has been disclosed, for example, by DE 40 36 510 A1. The known conveyor device, which is used to transport collapsible boxes contained between drivers, has a number of conveyor chains disposed parallel to one another, which respectively wind around gear-shaped deflecting wheels. Because of the deflecting wheels, the chain links of the conveyor chains are not permitted to exceed a particular length so that they can be reliably guided by the teeth of the deflecting wheels. Furthermore, guide rails are provided as a support for the erected collapsible boxes; the collapsible boxes slide along these guide rails and the drivers of the conveyor chains protrude between these rails. The guide rails are necessary since due to the danger of contamination or damage, the erected collapsible boxes cannot rest directly on the conveyor chains. The structural cost of the known conveyor device is relatively high as a result of the guide rails. Furthermore, small collapsible box formats are particularly difficult to manipulate due to the friction between the collapsible boxes and the guide rails.

ADVANTAGES OF THE INVENTION

The conveyor device according to the invention, has the advantage over the prior art that objects can be conveyed directly on the chain elements and therefore in a frictionless manner. Consequently, even small collapsible box formats are easy to manipulate. Furthermore, no additional guide rails or the like are required. Therefore in addition, the structural cost of the conveyor device is relatively low.

Other advantages and advantageous improvements of the conveyor device according to the invention ensue from the drawings claims and the specification.

BRIEF DESCRIPTIONS OF THE DRAWINGS

An exemplary embodiment of the invention is shown in the drawings and will be explained in detail below.

DESCRIPTION OF THE EXEMPLARY EMBODIMENTS

Figure 1:
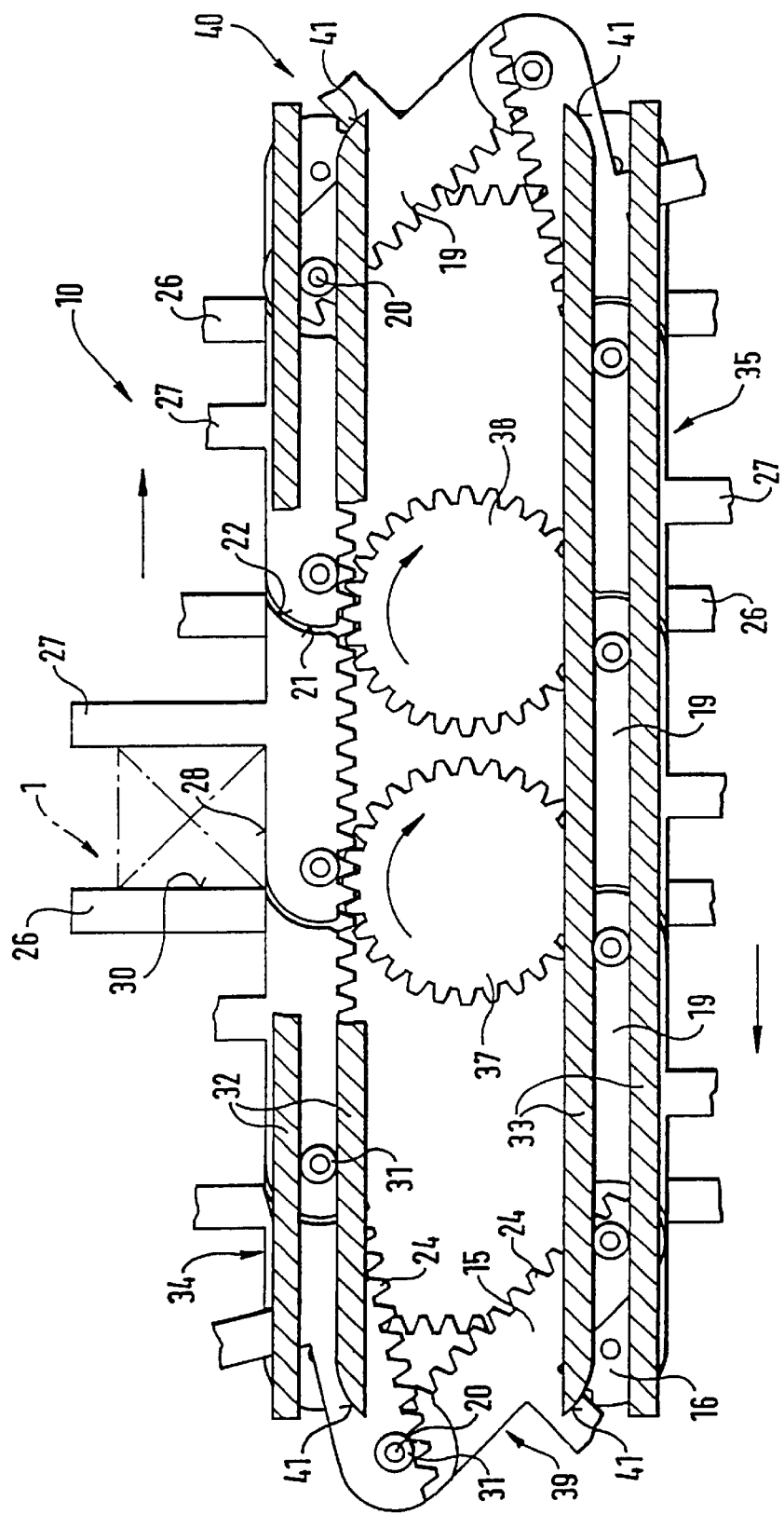
FIG. 1 shows a partially sectional side view of a conveyor device.
Figure 2:
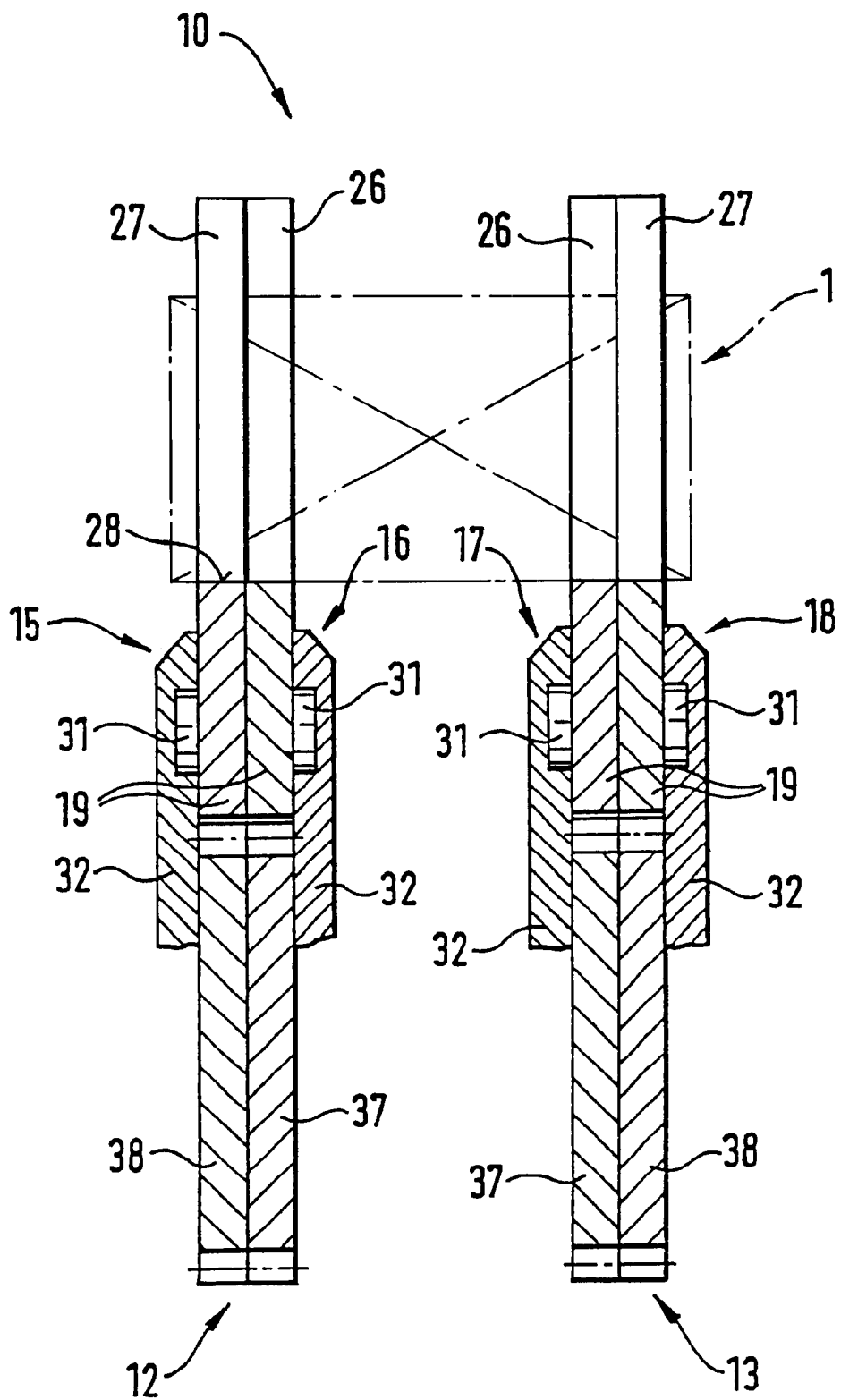
FIG. 2 shows a front sectional view of the conveyor device according to FIG. 1.

The conveyor device 10 shown in FIGS. 1 and 2 is used to transport objects, in particular erected collapsible boxes 1, and is a component of a cartoning machine, not shown. The conveyor device 10 has two endless conveyor chain pairs 12, 13, which are disposed parallel to one another at a distance that is adapted to the collapsible box format. Each conveyor chain pair 12, 13 is respectively comprised of two conveyor chains 15, 16 and 17, 18 of which the two outer conveyor chains 15, 18 in the top view and the two inner conveyor chains 16, 17 are moved synchronously with one another.

Each conveyor chain 15 to 18 is comprised of chain links 19 embodied in the form of racks, which are respectively connected to one another in an articulated fashion with a pivot pin 20. In order to permit the mobility of the chain links 19 around the axis of the pivot pins 20 and at the same time to permit a virtually gap-free transition between the individual chain links 19 of each conveyor chain 15 to 18, the chain links 19 are reduced in their thickness in the vicinity of the pivot pin 20, wherein they simultaneously overlap in this region. Furthermore, the end faces 21, 22 of the chain links 19 which directly adjoin one another are embodied as convex and concave.

The side faces of the conveyor chains 15 to 18 are embodied as smooth due to the overlapping of the individual chain links 19 of each conveyor chain 15 to 18 so that the side faces of the conveyor chains 15, 16 and 17, 18 that are oriented toward one another rest against one another in a sliding fashion.

On the underside of the chain links 19 remote from the collapsible boxes 1, the links have a gearing 24 that extends over their entire length while drive ribs 26, 27 that protrude perpendicularly from the chain links 14 are provided to receive the collapsible boxes 1. The drive ribs 26, 27, which are provided approximately in the middle of the chain links 19, together with the top side 28 of the chain links 19, which constitutes a flat support surface, form a positively engaging receptacle 30 for a collapsible box 1.

On the side faces of the conveyor chains 15, 16, and 17, 18 oriented away from one another, the pivot pins 20 are embodied in an elongated fashion as guide pins 31. The guide pins 31 slide in intermediary spaces of two respective guide rails 32, 33, which are embodied as straight and are disposed parallel to one another, which constitute an upper guide path 34 and a lower guide path 35 for the chain links 19. The distance of the guide rails 32, 33 from each other is embodied in such a way that two respective drive gears 37, 38 for the conveyor chains 15 to 18, which gears are disposed between the upper guide path 34 and the lower guide path 35, respectively engage simultaneously with a gearing 24 of a chain link 19 disposed on the upper guide path 34 and a chain link 19 disposed on the lower guide path 35.

The two drive gears 37 and the two other drive gears 38 are respectively coupled to each other so that the two inner conveyor chains 16, 17 and the two outer conveyor chains 15, 18 respectively can be driven in a synchronous manner. A drive mechanism, not shown, is used to drive the drive gears 37, 38. This drive comprises either a separate drive motor for each of the two drive gears 37 and 38 or comprises a common drive motor for all of the drive gears 37, 38, wherein the angular position of the two drive gears 37 can be changed in relation to the angular position of the two other drive gears 38 by means of a coupling device. Consequently, an adjustment of the distance between the drive ribs 26, 27 is permitted either by means of the two separate drive motors or by means of the coupling device, in order to adapt to different collapsible box formats.

The deflecting regions 39, 40 of the conveyor links 19 disposed at the two end faces of the guide rails 32, 33 are free of guide means. For a kinematically definite deflection of the conveyor links 19 that is free of guide means, it is essential that the distance between the two guide rails 32, 33 and the distance between two successive pivot pins 20 or guide pins 31 is embodied in such a way that in the deflecting regions 39, 40, at least one guide pin 31 of two successive conveyor links 19 respectively engages with one of the guide rails 32, 33 (see FIGS. 1 and 3). In order to facilitate the insertion of the guide pins 31 into the guide rails 32, 33, the entry regions on the sides of the guide rails 32, 33 oriented toward one another are provided with insertion radiuses 41.

Figure 3:
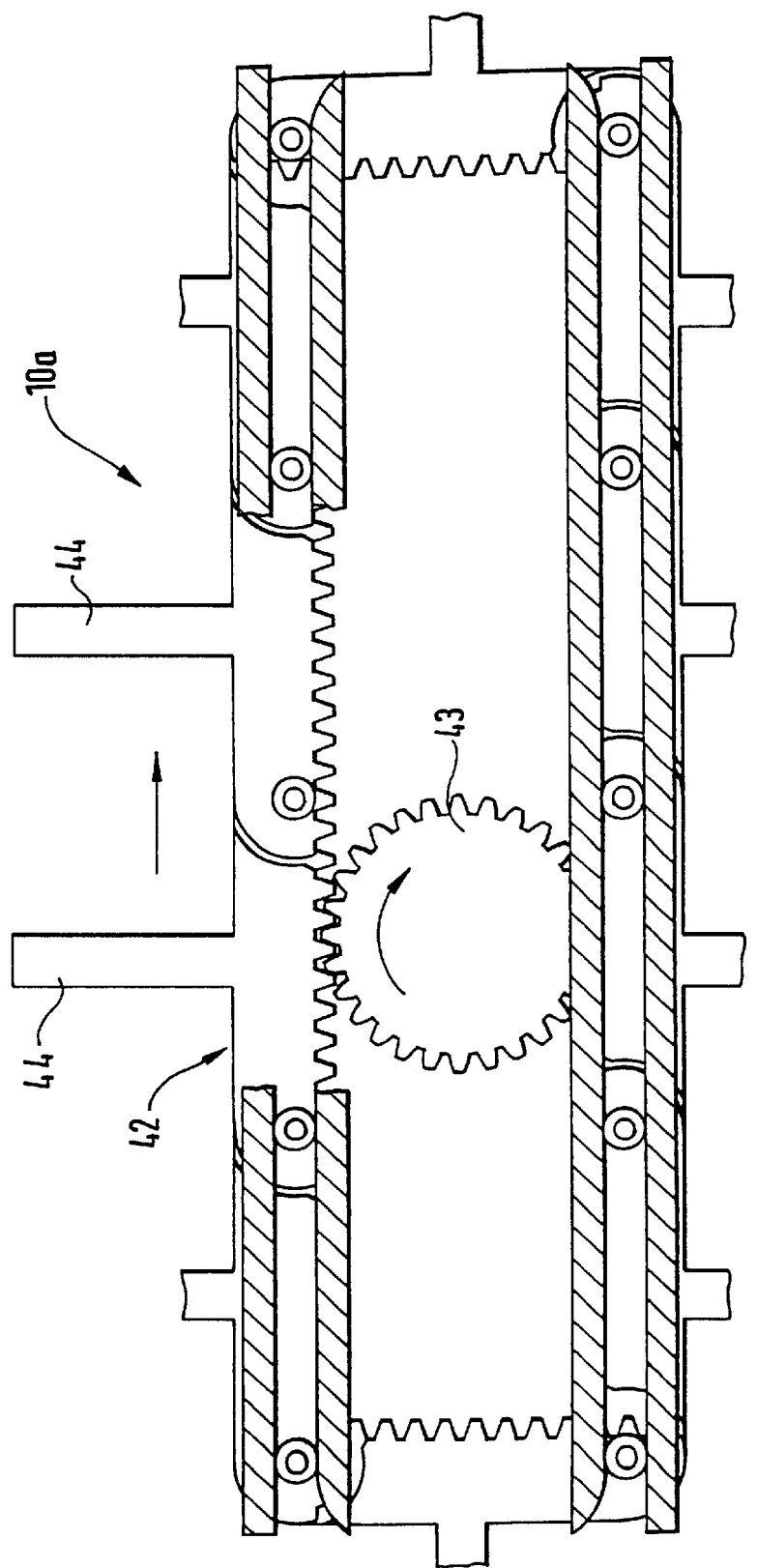
FIG. 3 shows the side view of a conveyor device which has been modified in relation to the conveyor device according to FIG. 1.

In the modified conveyor device 10a shown in FIG. 3, only a single conveyor chain 42 is provided, which has a drive gear 43. A conveyor device 10a of this type is suited for conveying objects whose size does not require any adaptation of the distance of its drive ribs 44. The structural cost is reduced in contrast to the device 10 because of the low number of parts.

It should also be mentioned that the two devices 10, 10a can be changed in different ways. Thus it is conceivable, for example, in order to drive the chain links disposed on the upper and lower guide path, to provide respectively separate drive mechanisms or drive gears that are coupled to one another. Furthermore, the device 10, 10a is also suited to be a conveyor belt if the drive ribs are eliminated. In order to reduce friction, it can be advantageous to provide rollers on the guide pins 31, which are guided in the guide rails and execute a rolling motion there. Finally, it is also conceivable to replace the rack drive of the chain links with a linear stepped drive.

The foregoing relates to a preferred exemplary embodiments of the invention, it being understood that other variants and embodiments thereof are possible within the spirit and scope of the invention, the latter being defined by the appended claims.

What is claimed is:

1. A conveyor device (10; 10a), which comprises a conveyor means (12, 13; 42) that is coupled to a drive mechanism, said conveyor means rotates between two deflecting regions (39, 40), and is respectively comprised of chain elements (19) that are connected at adjacent ends to one another by means of joints (20), wherein between the deflecting regions (39, 40), on upper and lower path sections (34, 35), at least one guide (32, 33) for the chain elements (19) is respectively disposed, each chain element (19) has a guide element (31) that cooperates with the at least one guide (32, 33), the deflecting regions (39, 40) are embodied so that they are free of guide means, that in the deflecting regions (39, 40), at least one guide element (31) of two successive end-to-end chain elements (19) is disposed in an operative connection with the upper and lower guide (32, 33) said guide elements being spaced apart to receive therebetween said chain elements (20), that the drive mechanism engages with the conveyor means (12, 13; 42) simultaneously on the upper and lower path sections (34, 35), that drive elements (26, 27; 44) are embodied on the chain elements (19) and, together with the top side (28) of the chain element (19), respectively constitute a positively engaging receptacle (30) for an erected collapsible box (1), that conveying means (12, 13) includes at least two conveyor chains (15 to 18) disposed parallel to one another whereas the distances between the drive elements (26, 27) of the conveyor chains (15 to 18) are adjustable in order to adapt to different collapsible box formats, that the side faces of the conveyor chains (15 to 18) are embodied as smooth due to an overlapping of the individual chain links (15 to 18) that are oriented toward one another rest against one another in a sliding fashion.

2. The conveyor device according to claim 1, in which a side of the chain element (19) oriented toward the drive mechanism is embodied as a rack profile (24).

3. The conveyor device according to claim 1, in which a drive mechanism has at least one drive gear (37, 38) that cooperates with a rack profile (24).

4. The conveyor device according to claim 2, in which a drive mechanism has at least one drive gear (37, 38) that cooperates with the rack profile (24).

5. The conveyor device according to claim 2, in which the rack profiles (24) are oriented toward one another and belong to the chain elements (19) of the upper and lower path sections (34, 35) and have a distance from one another that corresponds to a diameter of the at least one drive gear (37, 38) so that said at least one drive gear (37, 38) engages simultaneously with a rack profile (24) on the upper path section (34) and a rack profile (24) on the lower path section (35).

6. The conveyor device according to claim 3, in which the rack profiles (24) are oriented toward one another and belong to the chain elements (19) of the upper and lower path sections (34, 35) and have a distance from one another that corresponds to a diameter of the at least one drive gear (37, 38) so that said at least one drive gear (37, 38) engages simultaneously with a rack profile (24) on the upper path section (34) and a rack profile (24) on the lower path section (35).

7. The conveyor device according to claim 4, in which the rack profiles (24) are oriented toward one another and belong to the chain elements (19) of the upper and lower path sections (34, 35) and have a distance from one another that corresponds to a diameter of the at least one drive gear (37, 38) so that said at least one drive gear (37, 38) engages simultaneously with a rack profile (24) on the upper path section (34) and a rack profile (24) on the lower path section (35).

8. The conveyor device according to claim 1, in which the guide element (31) is disposed in an extension of the joint (20).

9. The conveyor device according to claim 2, in which the guide element (31) is disposed in an extension of the joint (20).

10. The conveyor device according to claim 3, in which the guide element (31) is disposed in an extension of the joint (20).

11. The conveyor device according to claim 4, in which the guide element (31) is disposed in an extension of the joint (20).

12. The conveyor device according to claim 1, in which the chain elements (19) are reduced in their thickness in a vicinity of the joints (20) so that the chain elements simultaneously overlap and that end faces (21, 22) of the chain elements (19) which directly adjoin one another are embodied as one of convex and concave.

13. The conveyor device according to claim 1, in which on the side faces of the conveyor chains (15 to 18) the joints (20) are embodied in an elongated fashion as guide pins (31) and that the guide pins (31) slide in intermediary spaces of guide rails (32,33).

* * * * *